(12) United States Patent
Doan et al.

(10) Patent No.: US 7,657,227 B2
(45) Date of Patent: Feb. 2, 2010

(54) METHOD AND SYSTEM FOR DYNAMIC DISPLAY CONNECTIVITY BASED ON CONFIGURATION INFORMATION VIA RFID TAG

(75) Inventors: Christopher Hoang Doan, Austin, TX (US); Liliana Orozco, Del Valle, TX (US); Leonel Saenz, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 11/462,259

(22) Filed: Aug. 3, 2006

(65) Prior Publication Data

US 2008/0030304 A1  Feb. 7, 2008

(51) Int. Cl.
*H04B 7/00* (2006.01)
(52) U.S. Cl. ............... 455/41.3; 455/41.2; 455/418; 455/420; 455/11.1; 455/556.1; 455/556.2; 455/557; 455/566; 345/169; 345/2.1; 345/2.2; 345/2.3; 348/14.02; 348/14.04
(58) Field of Classification Search ........ 455/41.1–41.3, 455/418–420, 11.1, 550.1, 556.1–556.2, 455/557, 566; 345/169, 2.1, 2.2, 2.3; 348/14.01–14.05, 348/14.07–14.08, 211.1, 211.2
See application file for complete search history.

(56) References Cited

U.S. PATENT DOCUMENTS 5,880,732 A * 3/1999 Tryding .............. 715/810

| 2002/0080090 A1* | 6/2002 | Borgstom et al. ............ 345/1.1 |
| 2002/0102998 A1* | 8/2002 | Lin ............................ 455/466 |
| 2002/0156677 A1 | 10/2002 | Peters et al. |
| 2003/0018541 A1 | 1/2003 | Nohr |
| 2004/0012620 A1 | 1/2004 | Buhler et al. |
| 2004/0179040 A1 | 9/2004 | Patel et al. |
| 2004/0266460 A1 | 12/2004 | Reynolds |
| 2005/0064911 A1 | 3/2005 | Chen et al. |
| 2005/0218218 A1 | 10/2005 | Kosher |
| 2006/0083194 A1* | 4/2006 | Dhrimaj et al. ............ 370/328 |

* cited by examiner

*Primary Examiner*—Tuan A Tran
(74) *Attorney, Agent, or Firm*—Dillon & Yudell LLP

(57) ABSTRACT

A method and system for providing enhanced display capability for mobile phones and handheld devices, such as Personal Digital Assistants (PDAs), when such devices are within range of external display devices equipped with Radio Frequency Identification (RFID) tags and display data receivers. The mobile phone searches for RFID tag-equipped external display devices, and upon locating such a device sends a request to the external device for connection and configuration information. Once the connection and configuration information from the external display device is received by the mobile phone or handheld device, a process of automatic synchronization between the mobile phone and the external display device occurs. The output images of the mobile phone are then transmitted to the external display device, which includes the functionality or mechanisms to receive and regenerate the output images.

19 Claims, 6 Drawing Sheets

METHOD AND SYSTEM FOR DYNAMIC DISPLAY CONNECTIVITY BASED ON CONFIGURATION INFORMATION VIA RFID TAG

BACKGROUND OF THE INVENTION

1. Technical Field

The present invention relates in general to the field of portable electronic devices and, in particular, to the connection between a portable electronic device having a small display screen and a remote display device. Still more particularly, the present invention relates to an improved method and system for providing enhanced display capability for mobile phones and handheld devices using Radio Frequency Identification (RFID) functionality.

2. Description of the Related Art

Radio Frequency Identification (RFID) is an electronic identification method, relying on storing and remotely retrieving data using devices called RFID tags or transponders. An RFID tag is a small object that can be attached to or incorporated into a device. RFID tags contain silicon microchips and antennas to enable the tags to receive and respond to Radio-Frequency (RF) queries from an RFID transmitter-receiver (transceiver).

RFID systems utilize an RFID transceiver unit (often referred to as an interrogator or base station) in order to query an RFID tag, which may be located at a distance from the transceiver unit. The silicon microchip within the RFID tag detects the interrogator's signal and transmits a response signal of encoded data via an antenna incorporated into the tag.

Mobile phones and handheld electronic devices can be found in almost every aspect of modern life. As the pervasiveness of mobile phones and handheld devices continues to increase, the portability and data storage capability of such devices continue to increase. Although the trend of technological advancement has continued at a similar pace with respect to the physical proportions, memory sizes, and processing speeds of the microchips within mobile phones and handheld devices, the display capacities of the built-in display screens of these devices has not advanced as rapidly. Consequently, an improved means of output display is needed. The present invention thus recognizes that a need exists for a method and system whereby mobile phones and handheld devices can connect directly and stream digital data to a remote display device, thereby leveraging the improved capacity and capabilities of the external display device.

SUMMARY OF THE INVENTION

Disclosed is a method and system for providing enhanced display capability for mobile phones and handheld devices, such as Personal Digital Assistants (PDAs), when such devices are within range of external display devices equipped with Radio Frequency Identification (RFID) tags and display data receivers. The mobile phone searches for RFID tag-equipped external display devices, and upon locating such a device sends a request to the external device for connection and configuration information. Once the connection and configuration information from the external display device is received by the mobile phone or handheld device, a process of automatic synchronization between the mobile phone and the external display device occurs. The output images of the mobile phone are then transmitted to the external display device, which includes the functionality or mechanisms to receive and regenerate the output images. The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
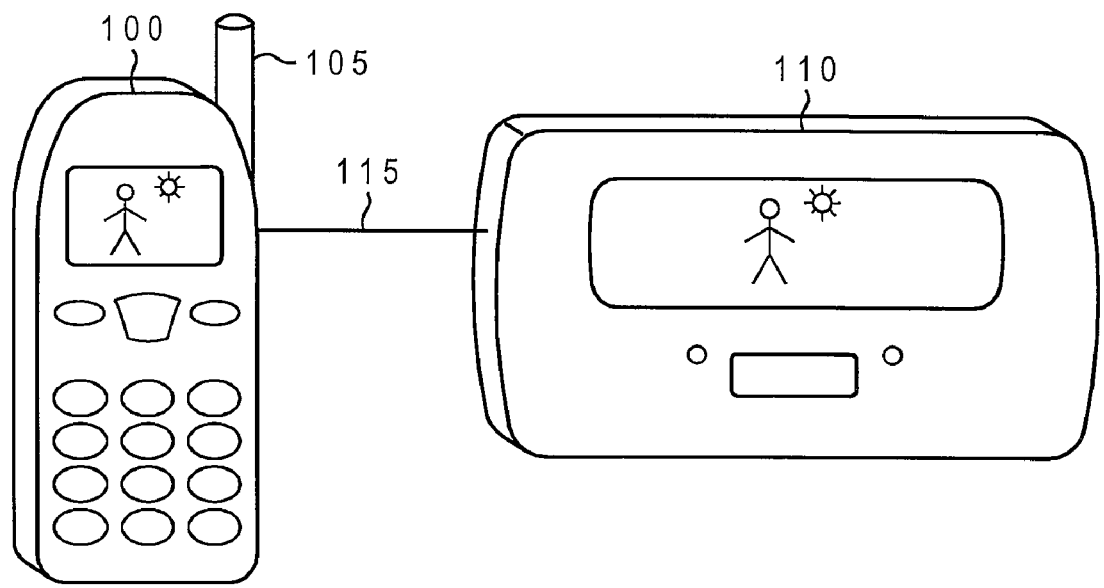
FIG. 1 depicts a simplified diagram of an external display device recreating an image from a mobile phone according to one embodiment of the invention.

The present invention provides a method and system for providing enhanced display capability for mobile phones and handheld devices through the use of Radio Frequency Identification (RFID) to facilitate the formation of a direct digital connection, thereby allowing the regeneration of output images of the external display device. As utilized herein, output generally refers to any image, text, video stream, and the like that may be displayed on mobile phone 100. As shown in FIG. 1, mobile phone 100 is used to display output. In one embodiment of the present invention, mobile phone 100 utilizes output transmission component 105 to transmit output images to external display device 110, via Radio Frequency (RF) signal 115. The image(s) displayed on mobile phone 100 is thereby re-created on external display device 110, which has more advanced display capabilities than mobile phone 100.

In an alternate embodiment of the invention, external display device 110 may instead be a computer monitor, television, Personal Digital Assistant (PDA), or any similar display device. Similarly, in another embodiment, mobile phone 100 could instead be replaced by another electronic device with a display screen, such as a PDA, minicomputer, computer notebook, IPOD, or MP3 player, within which visual output may be displayed.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
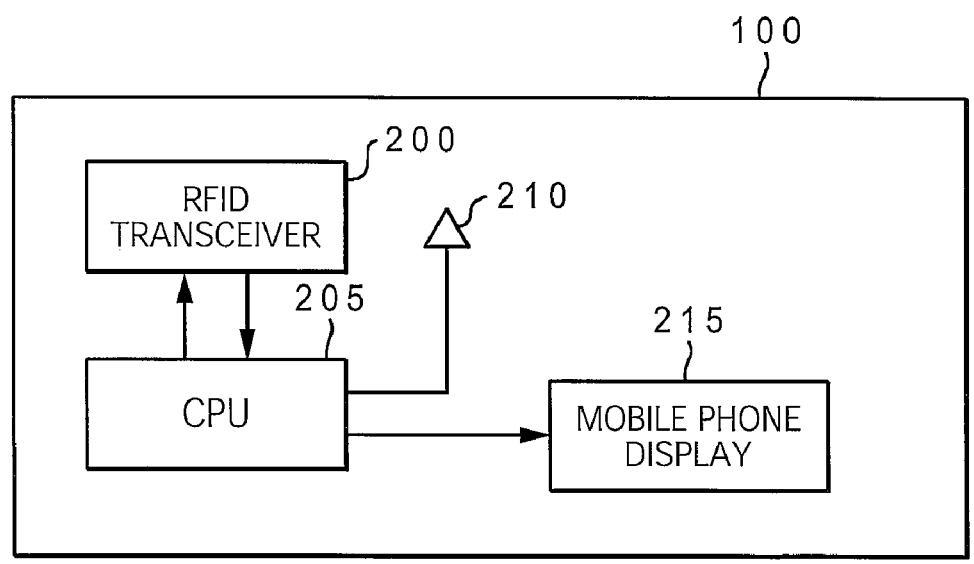
FIG. 2 depicts a simplified block diagram of the electronic components within a mobile phone, including an RFID transceiver and an output transmission component, as used in one embodiment of the present invention.
Figure 3:
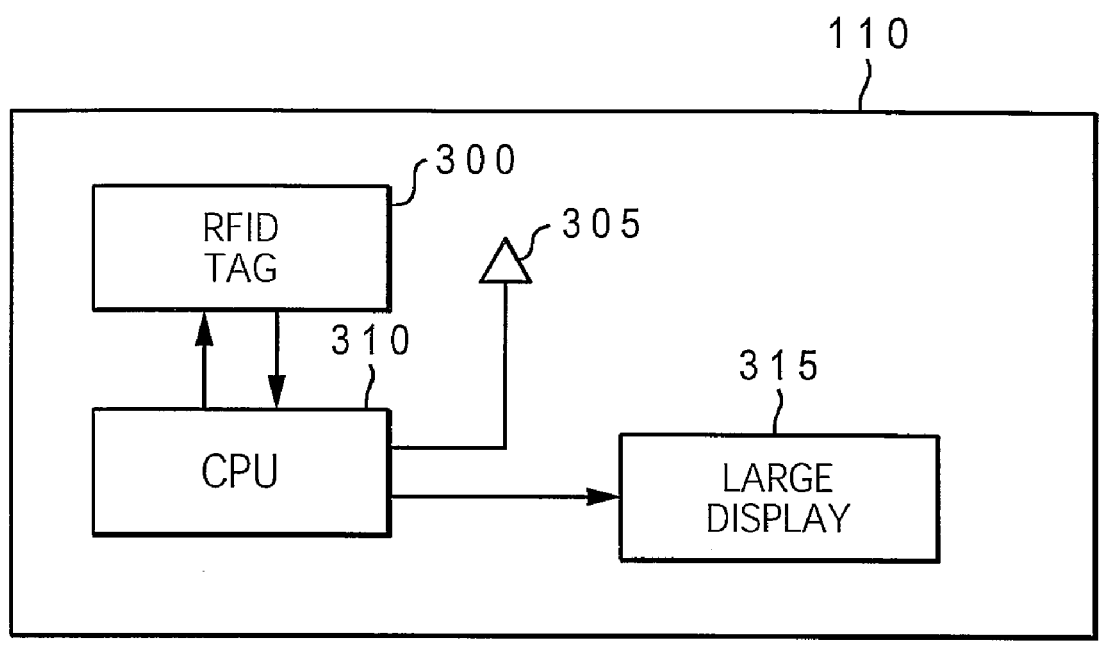
FIG. 3 depicts a simplified block diagram of the electronic components within an external display device, including an RFID tag and as used in one embodiment of the present invention.

With reference now to FIG. 2, there is depicted a simplified block diagram of one embodiment wherein mobile phone 100 also contains Central Processing Unit (CPU) 205, which is used to process incoming and outgoing signals and also to control the electronic components of mobile phone 100, such as output transmission component 210 and mobile phone display 215. Mobile phone 100 also contains RFID transceiver 200, which is used to scan for RFID tags located within external display devices (e.g. device 110). During implementation of the processes of the invention, transceiver 200 searches for and locates an RFID tag within external display device 100. As illustrated in FIG. 3, which is described in greater detail below, RFID tag 300 contains connection and configuration information specifically related to external display device 110. RFID transceiver 200 of mobile phone 100 initially locates RFID tag 300 with connection and configuration information compatible to mobile phone 100. CPU 205 then utilizes the connection and configuration information, received from RFID transceiver 200, to connect to external display device 110 via output transmission component 210. The output images on mobile display 215 are then transmitted to external display device 110 via output transmission device 210. The particular wireless transmission method utilized to transmit the output may be any one of the available protocols from among Bluetooth, RFID transmission, 1G (First Generation), 2G, 2.5G, 3G, 4G, 802.11b, CDPD (Cellular Digital Packet Data), SMS, as well as any other wireless transmission protocols. While CPU 205 is shown directly connected to mobile phone display 215, an alternate embodiment of the invention may provide CPU 205 coupled to an independent video driver chip, which then controls mobile phone display 215.

Turning now to FIG. 3, there is depicted a simplified block diagram of internal components of external display device 110. As illustrated, external display device 110 comprises RFID tag 300, display data receiver 305, large display 315, and CPU 310. While display screen of external display device 110 is referred to herein as large display 315, it is understood that the features of the invention are fully applicable (or may be implemented) with an external display device 110 having any sized screen, ranging from screens that are smaller in size than mobile phone display 215 to ones that are much larger than mobile phone display 215, and including screens with better resolution, color, or other attributes. Use of large display 315 is solely for description of one specific embodiment of the invention.

In the illustrated embodiment, external display device 110 utilizes RFID tag 300 to transmit connection and configuration information to mobile phone 100. Once mobile phone 100 receives the connection and configuration information, as mentioned above, external display device 110 receives digital output from mobile phone 100 via display data receiver 305. External display device 110 then utilizes CPU 310 to decode the output data, which is subsequently regenerated on large display 315. Notably while external display device 110 is illustrated with CPU 310, it is understood that in an alternate embodiment, external display device 110 may be a passive display device without CPU 310. In such embodiment, external display device 110 comprises logic for image regeneration and the received signal is merely displayed via an image regenerator without additional processing. The image regeneration function may alternatively be accomplished by logic within CPU 310.

Figure 4:
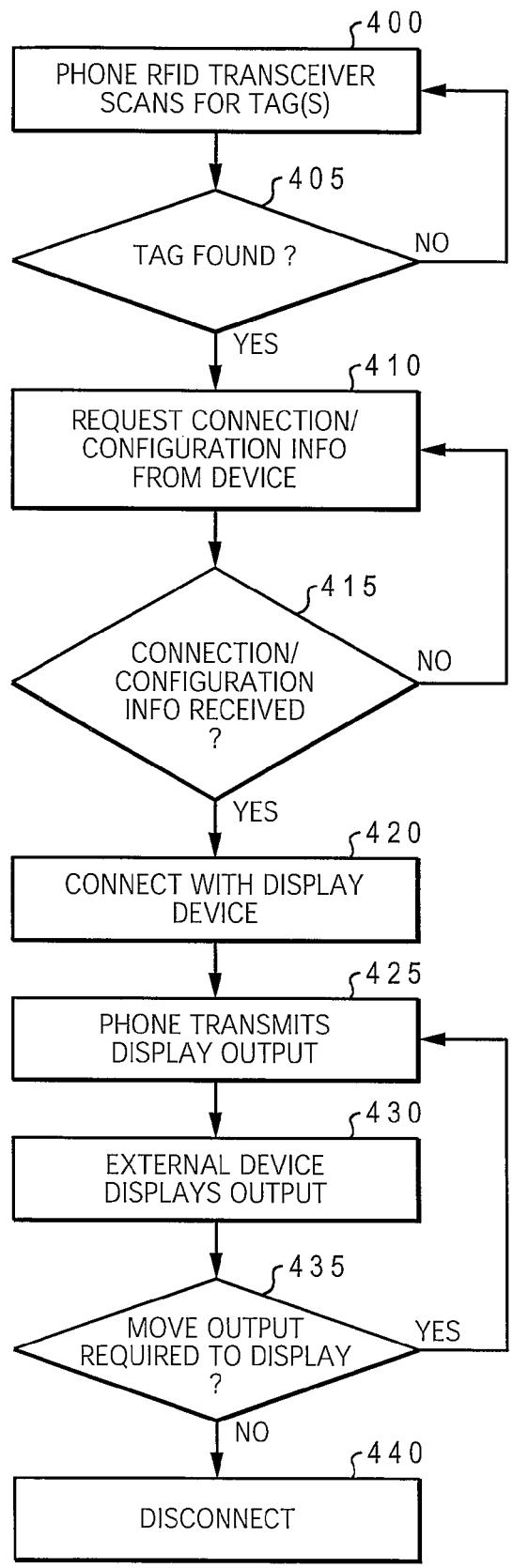
FIG. 4 depicts a high-level flow chart of the processes occurring during implementation of one embodiment of the invention.

Reference is now made to FIG. 4, which is a high-level flowchart describing one embodiment of the present invention for recreating images from mobile phone 100 on larger external display device 110. As depicted in block 400, mobile phone 100 actively scans for RFID tag(s) 300. A determination is made at block 405, whether RFID tag 300 associated with an external display device 110 has been found. If RFID tag 300 is found, mobile phone 100, having located external display device 110 equipped with RFID tag 300, issues a request for connection and configuration information, as depicted at block 410. Alternatively, external display device 110 broadcasts the connection and configuration information, in which case mobile phone 100 simply receives the connection and configuration information from external display device 110 without having to issue a request for such information. At decision block 415, mobile phone 100 determines whether connection and configuration information has been received. If connection and configuration information has been received from external display device 110, mobile phone 100 proceeds to connect with external display device 110, as shown in block 420. If connection and configuration information has not been received from external display device 110, mobile phone 100 waits until connection and configuration information is received before proceeding.

In an alternate embodiment of the invention, mobile phone 100 employs a timeout function, as opposed to the continuous scan loop depicted between block 400 and decision block 405, in order to conserve power. In such an embodiment, mobile phone 100 scans for RFID tags on nearby external display devices 110 for a pre-set period of time, or mobile phone 100 executes a pre-established number of scans, as determined by the mobile phone user or manufacturer. When the pre-set period expires or the pre-established number of scans is completed, mobile phone 100 halts the scanning process and may also display an error message. In the event that the user later locates a suitable external display device 110, the user may manually re-initiate the scanning process. A similar timeout function may be utilized between block 410 and decision block 415 to conserve power in cases where mobile phone 100 does not receive connection and configuration information from external display device 110 within pre-established/pre-set periods.

In another embodiment of the present invention, an authorization process is required to be completed by mobile phone 100, or the mobile phone user, prior to enabling connection with external display device 110. This authorization would occur prior to block 420 (i.e. before allowing the connection to external display device 110), and is implemented via one of several methods, including but not limited to: (1) automatic authorization, whereby mobile phone 100 is designed or configured with the required attributes to be compatible with external display device 100; (2) authorization only in the event that mobile phone 100 supports the particular configuration of external display device 110; (3) manual authorization via a security code entered by the user; or (4) automatic authorization via a pre-established code pre-set by the user within mobile phone 100.

After mobile phone 100 connects to external display device 110 at block 420, mobile phone 100 utilizes output transmission component 210 to transmit output images to external display device 110, as shown in block 425. External display device 110 then regenerates the images on large display 315 at block 430. When determination block 435 is reached, mobile phone 100 determines whether additional output is available and/or required to be re-created on large display 315. If additional output is available/required for display, mobile phone 100 continues output transmission by returning to block 425. In the event that no additional output is necessary or that attenuation of the wireless signal below a threshold level required for wireless transmission has occurred, mobile phone 100 terminates the connection with external display device 110, as depicted in block 440.

In an alternate embodiment of the present invention, a decision is made prior to disconnection at block 440, wherein mobile phone 100 utilizes a delay process to prevent premature disconnection during cases where additional images are required for display but the output images have not yet been fully processed by mobile phone 100. During such a delay process, mobile phone 100 would wait for a pre-set or pre-established period of time, as determined by the mobile phone user or manufacturer, before disconnecting from the communication channel between mobile phone 100 and external display device 110.

Figure 5A:
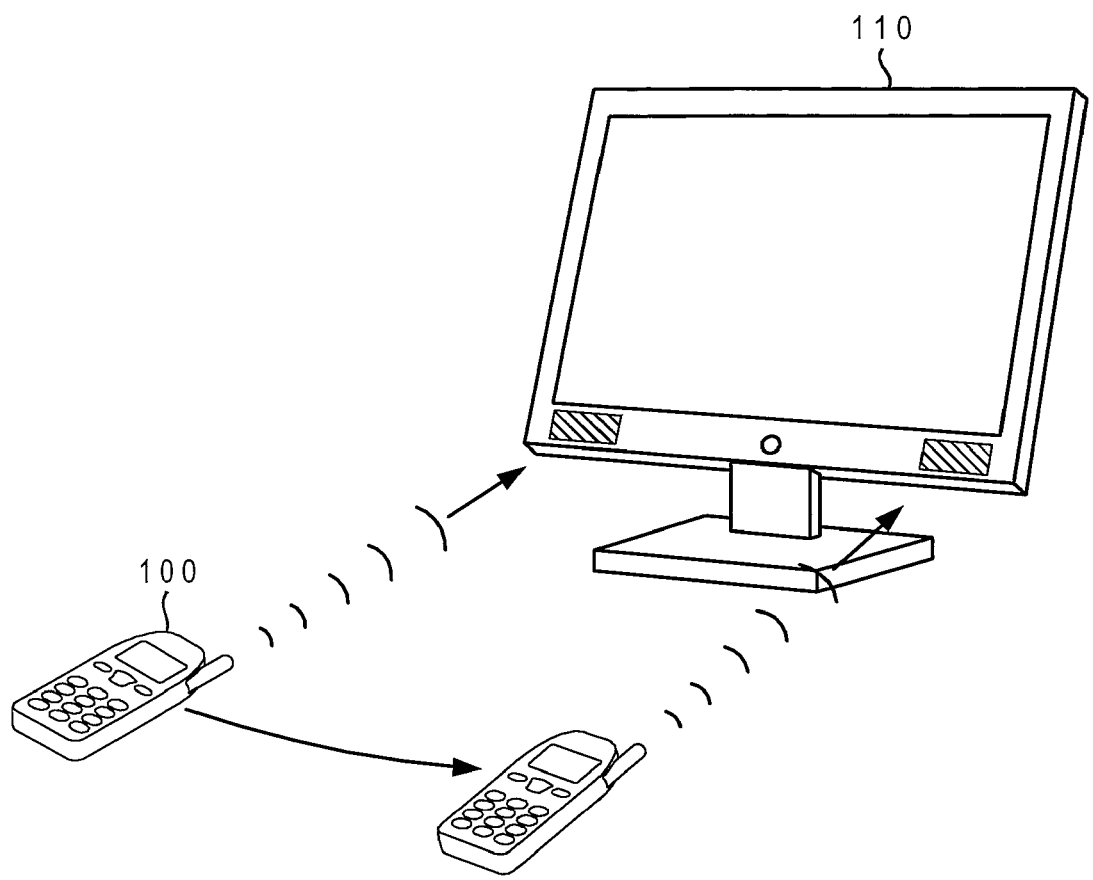
FIGS. 5A-5E depict several implementations of various embodiments of the present invention.
Figure 5B:
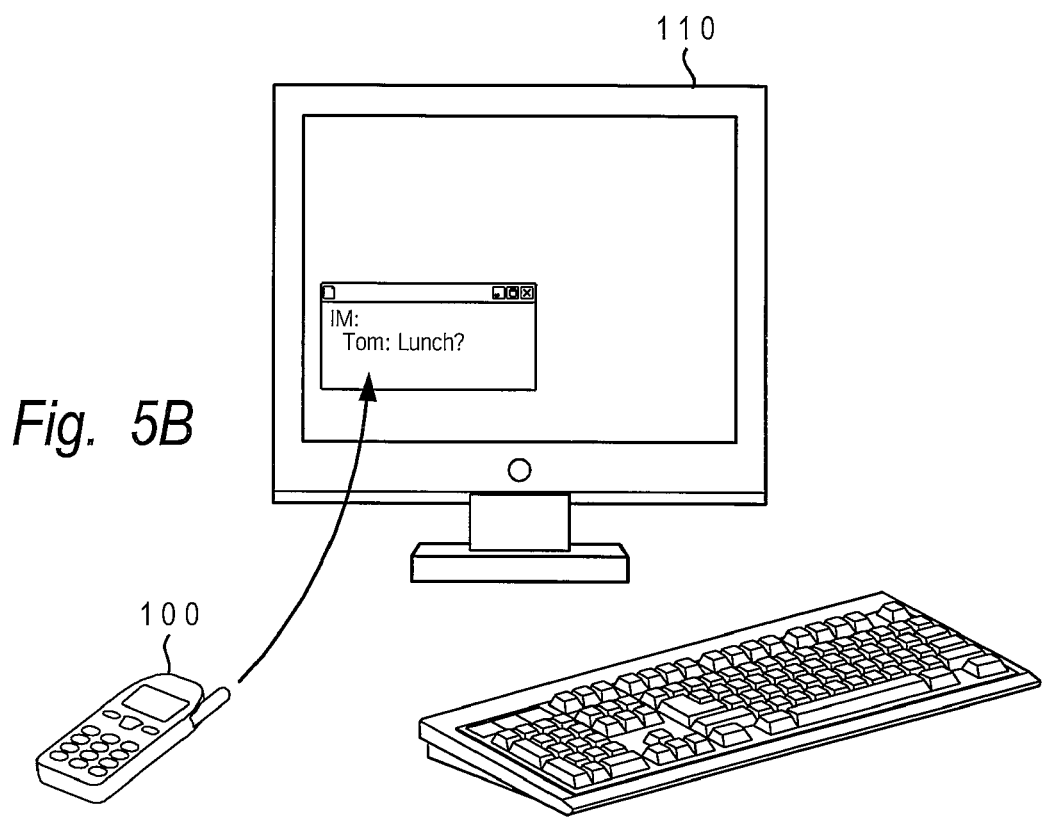
Figure 5C:
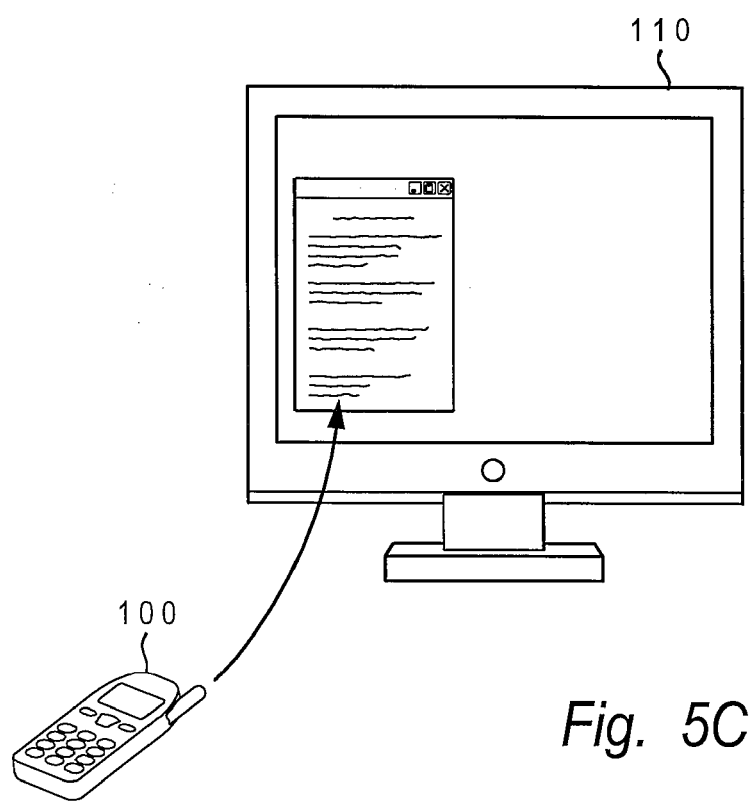
Figure 5D:
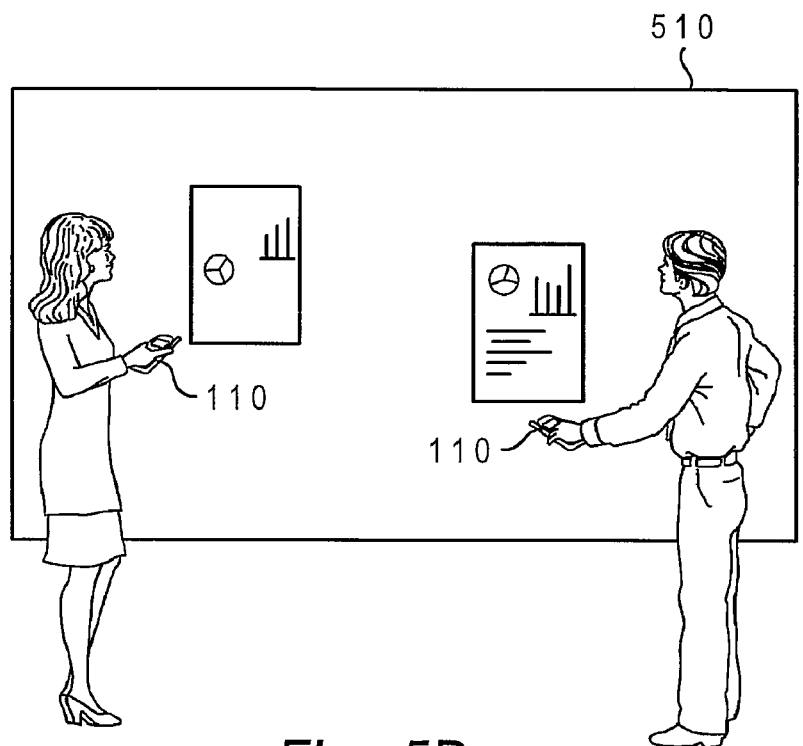
Figure 5E:
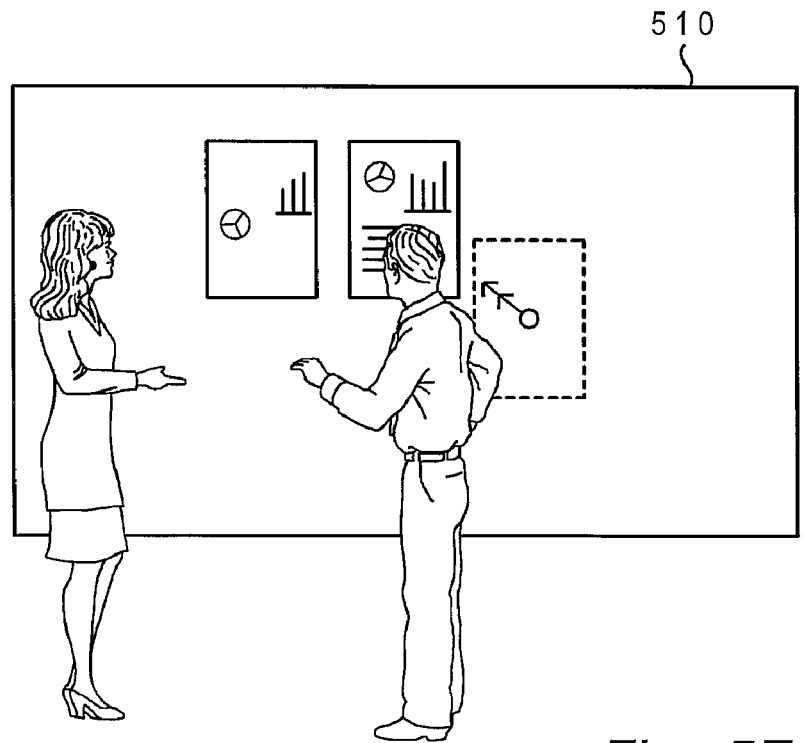

FIGS. 5A-5E depict several implementations of various embodiments of the present invention. FIG. 5A depicts mobile phone 100 connecting to external display device 110 while moving in relation to external display device 110. FIG. 5B depicts mobile phone 100 utilizing external display device 110 to display dynamic content. FIG. 5C depicts mobile phone 100 utilizing external display device 110 to display static content. FIG. 5D depicts mobile phone 100 displaying images on large wall display 510. FIG. 5E depicts the image displayed on large wall display 510 moving in relation to the movement of mobile phone 100. According to this embodiment, the remote display device includes a lateral screen mobility function, which enables the viewable output on the remote display device to be moved in a lateral direction on the remote display device relative to a lateral movement of the first device by the user. As utilized herein, lateral refers to any directional movement on an X-Y planar axis.

It is understood that the use of specific parameter names are for example only and not meant to imply any limitations on the invention. The invention may thus be implemented with different nomenclature/terminology utilized to describe the above parameters, without limitation.

As a final matter, it is important that while an illustrative embodiment of the present invention has been, and will continue to be, described in the context of a fully functional mobile phone system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard disk drives, CD ROMs, DVDs and transmission type media such as digital analogue communication links.

While the invention has been particularly shown and described with reference to one embodiment, it will be understood by those skilled in the art that various changes in form and detail may be made therein without departing from the spirit and scope of the invention.

What is claimed is:

1. A method for enabling display on a remote display device of output of a first device, which is equipped with a radio frequency identification (RFID) receiver, said method comprising:
   generating said output on the first device;
   scanning airwaves surrounding the first device for an RFID tag associated with the remote display device, said RFID tag providing one or more connection and configuration parameters required for wireless communication with the remote display device; and
   when the one or more connection and configuration parameters of the remote display device are detected, forwarding the output of the first device via a wireless transmission to the remote display device for re-generation of the output on the remote display device, wherein the remote display device includes a lateral screen mobility function, the method for displaying the output on the remote display device includes laterally moving the output displayed on the remote device relative to a lateral movement of the first device.

2. The method of claim 1, wherein said scanning comprises:
   activating said RFID receiver to initiate said scanning for the connection and configuration parameters; and
   de-activating the RFID receiver when the connection and configuration parameters are detected and received.

3. The method of claim 1, wherein said first device has an RFID transmitter and said scanning comprises:
   transmitting a request for said connection and configuration parameters, said request triggering a passive RFID tag to respond with its connection and configuration parameters; and
   activating a timer comprising one of (a) a preset amount of requests to issue and (b) a preset amount of time before the request is determined to have failed; and
   outputting an error message to alert a user of the first device that the request has failed to return connection and configuration parameters of the remote output device.

4. The method of claim 1, wherein said forwarding further comprises:
   first determining that the connection and configuration parameters of the remote output device is supported by the first device; and
   when the connection and configuration parameters are supported by the first device, establishing a wireless connection with the remote display device for transmitting output to the remote display device.

5. The method of claim 4, wherein said establishing further comprises:
   completing an authorization and activation process to wirelessly link the first device to the remote display device, said authorization and activation process being one of several pre-programmable and system specific processes from among:
   (1) automatic authorization and activation of the wireless link, whereby the first device is designed or configured with the required attributes to be compatible with the remote display device;
   (2) authorization and activation of the wireless link only when the first device supports the particular configuration of remote display device;
   (3) enabling manual authorization and activation of the wireless link via entry into the first device of a preset security code by a user; and
   (4) automatic authorization and activation of the wireless link via a pre-established code pre-entered within the first device.

6. The method of claim 4, further comprising:
   automatically terminating the wireless link responsive to one of a plurality of pre-identified occurrences from among: the user manually terminating the wireless link and output transmission on the first device; the completion of the output being transmitted via the wireless link, wherein a preset time period without a new output automatically terminates the wireless link; disconnection of the wireless link at the remote output device; and attenuation of the wireless signal transmitted via the wireless link to below a threshold level required for wireless transmission of the output on the wireless link.

7. The method of claim 1, wherein the wireless transmission of the output is completed via at least one of several available wireless transmission methods from among: Bluetooth, RFID transmission, 1G, 2G, 2.5G, 3G, 4G, 802.11b, CDPD, and SMS.

8. The method of claim 1, wherein the first device is an electronic device having a display screen and which generates output, such as, a mobile phone, a personal digital assistant (PDA), a mini computer, a computer notebook, an IPOD, and an MP3 player.

9. The method of claim 1, wherein:
the remote display device comprises the display screen, an RFID tag, a wireless signal receiver for receiving output data, and an output data regenerator for regenerating received output data for display on the display screen.

10. A computer program product comprising a computer readable medium and program code stored on the computer readable medium that when executed on the first device implements the steps of claim 1.

11. A computer program product comprising a computer readable medium and program code stored on the computer readable medium that when executed on the first device implements the steps of claim 4.

12. An electronic device comprising:
a display screen on which visual output is displayed;
internal circuitry and executing program code that generates said visual output;
an RFID receiver, which scans for and receives specific configuration and attribute parameters from a remote display device adapted with an RFID tag; and
means, when said visual output is generated, for:
    initiating a scan for said specific connection and configuration parameters; and
    when the specific connection and configuration parameters are located:
        activating a wireless link with the remote display device having the specific connection and configuration parameters; and
        wirelessly transmitting said visual output to said remote display device via the wireless link wherein said remote display device displays said visual output remote from the electronic device, and wherein the remote display device includes a lateral screen mobility function, the display of the output on the remote display device moves in a lateral position on the remote display device relative to a corresponding lateral movement of the electronic device.

13. The electronic device of claim 12, further comprising:
means for activating said RFID receiver to initiate said scanning for the connection and configuration parameters; and
means for de-activating the RFID receiver when the connection and configuration parameters are detected and received.

14. The electronic device of claim 12, further comprising:
an RFID transmitter; and
wherein said means for initiating a scan comprises:
    means for transmitting a request for said connection and configuration parameters, said request triggering a passive RFID tag to respond with its connection and configuration parameters; and
    means for activating a timer comprising one of (a) a preset amount of requests to issue and (b) a preset amount of time before the request is determined to have failed; and
    means for outputting an error message to alert a user of the first device that the request has failed to return connection and configuration parameters of the remote output device.

15. The electronic device of claim 12, wherein said means for wireless transmitting further comprises:
means for first determining that the connection and configuration parameters of the remote output device is supported by the first device; and
means, when the connection and configuration parameters are supported by the first device, for establishing a wireless connection with the remote display device for transmitting output to the remote display device;
wherein said means for establishing further comprises means for completing an authorization and activation process to wirelessly link the first device to the remote display device, said authorization and activation process being one of several pre-programmable and system specific processes from among:
    (1) automatic authorization and activation of the wireless link, whereby the first device is designed or configured with the required attributes to be compatible with the remote display device;
    (2) authorization and activation of the wireless link only when the first device supports the particular configuration of remote display device;
    (3) enabling manual authorization and activation of the wireless link via entry into the first device of a preset security code by a user; and
    (4) automatic authorization and activation of the wireless link via a pre-established code pre-entered within the first device.

16. The electronic device of claim 15, further comprising:
means for automatically terminating the wireless link responsive to one of a plurality of pre-identified occurrences from among: the user manually terminating the wireless link and output transmission on the first device; the completion of the output being transmitted via the wireless link, wherein a preset time period without a new output automatically terminates the wireless link; disconnection of the wireless link at the remote output device; and attenuation of the wireless signal transmitted via the wireless link to below a threshold level required for wireless transmission of the output on the wireless link.

17. A remote display device configured with the display screen and the RFID tag according to claim 1, said remote display device further comprising:
a wireless signal receiver for receiving output data;
an output data regenerator for regenerating received output data for display on the display screen; and
when the remote display device includes a lateral screen mobility function, the display of the output on the remote display device moves in a lateral position on the remote display device relative to a corresponding lateral movement of the first device.

18. A system for remote display of information comprising:
a display device equipped with an RFID tag that provides specific connection and configuration parameters of the display device;
a portable electronic device equipped with an RFID reader, said portable electronic device having electronic circuitry and code for generating visual information, said portable electronic device being one of a mobile phone, a personal digital assistant (PDA), a mini computer, a computer notebook, an IPOD, and an MP3 player;
said portable electronic device further comprising means, responsive to detecting the display device equipped with the RFID tag, for communicating commands from the portable electronic device to the display device for displaying the visual information from the portable electronic device on the display device;

wherein a small display of the portable electronic device is synchronized with the display device; and wherein, when the visual information requires more display area than is available on a display screen of portable electronic device, the entire visual information is displayed on the display device, while only a subset of the information displayed on the display device is displayed on the small display.

19. The system of claim 18, wherein:

said portable electronic device further comprises means for negotiating access to the display device dependent on user permissions stored in the portable electronic device; and said display device further comprises a wireless signal receiver for wirelessly receiving the visual information and a received data regenerator for regenerating received visual information for display on the display device.

* * * * *

UNITED STATES PATENT AND TRADEMARK OFFICE
CERTIFICATE OF CORRECTION

PATENT NO. : 7,657,227 B2 Page 1 of 1
APPLICATION NO. : 11/462259
DATED : February 2, 2010
INVENTOR(S) : Doan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this

Thirtieth Day of November, 2010

David J. Kappos
*Director of the United States Patent and Trademark Office*